US008755809B2

(12) United States Patent
Kwon et al.

(10) Patent No.: US 8,755,809 B2
(45) Date of Patent: Jun. 17, 2014

(54) COMMUNICATION METHOD OF BASE STATION AND TARGET TERMINAL

(75) Inventors: Tae Soo Kwon, Hwaseong Si (KR); Woo Geun Ahn, Daejeon (KR); Dong Ho Cho, Daejeon (KR); Ju Yong Lee, Daejeon (KR); Jong Bu Lim, Yongin-si (KR); Hyun Gi Ahn, Incheon-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 198 days.

(21) Appl. No.: 13/169,209

(22) Filed: Jun. 27, 2011

(65) Prior Publication Data

US 2012/0108257 A1    May 3, 2012

(30) Foreign Application Priority Data

Oct. 27, 2010  (KR) .................... 10-2010-0105080

(51) Int. Cl.
*H04W 72/00* (2009.01)

(52) U.S. Cl.
USPC ........................................ 455/452.1; 370/329

(58) Field of Classification Search
CPC .... H04B 7/0632; H04B 7/08; H04L 25/0226; H04L 5/0007; H04W 72/04; H04W 8/005; H04W 84/005; H04W 84/047; H04W 36/04; H04W 48/10

USPC ........ 455/452.1, 456.6, 509, 514, 434, 432.1, 455/436, 450, 561, 445, 524–525, 550.1, 455/449; 370/252, 342–343, 328–330
See application file for complete search history.

(56) References Cited

U.S. PATENT DOCUMENTS

| | | | | |
|---|---|---|---|---|
| 5,734,646 A * | 3/1998 | I et al. | | 370/335 |
| 2009/0154379 A1 * | 6/2009 | Hayashi et al. | | 370/280 |
| 2009/0296680 A1 * | 12/2009 | Suzuki et al. | | 370/342 |
| 2010/0061258 A1 * | 3/2010 | Seo et al. | | 370/252 |
| 2010/0093287 A1 * | 4/2010 | Higuchi et al. | | 455/67.13 |
| 2010/0177732 A1 * | 7/2010 | Watanabe et al. | | 370/330 |

FOREIGN PATENT DOCUMENTS

| | | |
|---|---|---|
| JP | 2006-019820 | 1/2006 |
| JP | 2009-152688 | 7/2009 |
| KR | 10-2002-0000414 | 1/2002 |
| KR | 10-2003-0052568 | 6/2003 |
| KR | 10-0811843 | 3/2008 |
| KR | 10-0942808 | 2/2010 |
| KR | 10-2010-0053837 | 5/2010 |

OTHER PUBLICATIONS

3GPP TS 36.213 v8.8.0, "Evolved Universal terrestrial Radio Access (E-UTRA); Physical Layer Procedures," Sep. 2009.

(Continued)

*Primary Examiner* — Nathan Taylor
(74) *Attorney, Agent, or Firm* — NSIP Law (57) ABSTRACT

Provided is a communication method of a base station and a target terminal. Resources used for a channel feedback may be reduced by determining a wireless resource based on information about a channel and information about a mobility of the target terminal in each of at least one route, and by feeding back channel state information.

21 Claims, 9 Drawing Sheets

(56) References Cited

OTHER PUBLICATIONS

Kim et al., "An Optimum Subcarrier and Bit Allocation Period Based on Mobile Speed for OFDM Systems," IEEE Communications Letters, vol. 11, No. 3, Mar. 2007, pp. 249-251.

Kyosti et al., *IST-4-027756 WINNER II*, Wireless World Initiative New Radio (WINNER) Phase II, 2006, https://www.ist-winner.org. International Search Report issued on Mar. 28, 2012 in counterpart International Application No. PCT/KR2011/006186 (3 pages, in English).

* cited by examiner

COMMUNICATION METHOD OF BASE STATION AND TARGET TERMINAL

CROSS-REFERENCE TO RELATED APPLICATION(S)

This application claims the benefit under 35 U.S.C. §119(a) of Korean Patent Application No. 10-2010-0105080, filed on Oct. 27, 2010, in the Korean Intellectual Property Office, the entire disclosure of which is incorporated herein by reference for all purposes.

BACKGROUND

1. Field

The following description relates to a communication method of a base station and a target terminal.

2. Description of Related Art

In a mobile telecommunication system, a target terminal may be a vehicular mobile terminal. As a velocity of a vehicular mobile terminal increases, a coherence time may become relatively small. Thus, the vehicular mobile terminal may use a large amount of overhead for communicating channel feedback information. Even if channel quality is relatively high, scheduling may not frequently occur. Thus, when a channel feedback interval becomes shorter as a channel quality becomes higher, redundant feedback may occur. Specific information for forming a feedback interval of channel information according to a channel quality may also be applied.

SUMMARY

In one general aspect, there is provided a communication method of a base station, including storing, in a channel database, information about a channel in each of at least one route, acquiring information about a mobility of a target terminal, determining a wireless resource for the target terminal based on the information about a mobility of a target terminal and the information stored in the channel database, and transmitting, to the target terminal, information about the wireless resource of the target terminal.

The storing may include acquiring the information about the channel in each of the at least one route using at least one vehicular mobile terminal having a planned route.

The acquiring of the information about the channel may include receiving, from the at least one vehicular mobile terminal, information about one selected from the group of a channel, a location, a velocity of the at least one vehicular mobile terminal, and any combination thereof.

The receiving may include receiving the information about the one selected from the group of a channel, a location, and a velocity of the at least one vehicular mobile terminal when a change of a channel of the at least one vehicular mobile terminal exceeds a predetermined level.

The information about a mobility of the target terminal may include at least one selected from the group of information about a location of the target terminal, information about a velocity of the target terminal, information about a moving direction of the target terminal, information about a signal light present in a route of the target terminal, and any combination thereof.

The information about a location of the target terminal may be measured using a location determination technology determined in advance, or is received from the target terminal or from a global positioning system (GPS) server of the target terminal.

The method may further include generating the information about the wireless resource using a predetermined bitmap.

The determining may include determining a feedback wireless resource used for feeding back channel state information by the target terminal, based on the information about the mobility the a target terminal and the information stored in the channel database.

The method may further include receiving the channel state information of the target terminal using the feedback wireless resource.

The determining of the feedback wireless resource may include determining at least one selected from the group of a feedback time interval used for feeding back channel state information by the target terminal and a delay time remaining until the feedback time interval.

The determining of the at least one selected from the group of the feedback time interval and the delay time may include comparing a predetermined channel boundary value with a value associated with the channel state information of the target terminal, and using a result of the comparing to determine the at least one selected from the group of the feedback time interval and the delay time.

The determining of the at least one selected from the group of the feedback time interval and the delay time may include adjusting the channel boundary value based on at least one selected from the group of a channel quality of the target terminal, a traffic rate requested by the target terminal, a channel reliability of the target terminal, and any combination thereof.

The determining of the at least one selected from the group of the feedback time interval and the delay time may include determining the at least one selected from the group of the feedback time interval and the delay time, based on at least one selected from the group of information about a traffic rate requested by the target terminal and information about an allowable limit of a delay time of the target terminal.

In another general aspect, there is provided a communication method of a target terminal, the method comprising receiving, from a base station, information about a wireless resource of the target terminal; and transmitting data to the base station using the wireless resource of the target terminal, wherein the wireless resource of the target terminal is determined by the base station based on information about a channel and information about a mobility of the target terminal in each of at least one route.

The transmitting may include feeding back channel state information of the target terminal using the wireless resource of the target terminal.

The information about the wireless resource of the target terminal may include at least one selected from the group of information about a feedback time interval used for feeding back the channel state information by the target terminal and a feedback wireless resource with respect to a delay time remaining until the feedback time interval.

The feeding back may include operating a timer counting a delay time remaining until the feedback time interval used for feeding back the channel state information by the target terminal, and transmitting, to the base station, the channel state information of the target terminal in response to a completion of the counting.

The method may further include transmitting, to the base station, the information about the mobility of the target terminal.

The information about a mobility of the target terminal may include at least one selected from the group of information about a location of the target terminal, information about a velocity of the target terminal, information about a moving direction of the target terminal, information about a signal light present in a route of the target terminal, and any combination thereof.

The method may further include detecting the feedback wireless resource from information about the feedback wireless resource using a predetermined bitmap.

The above methods may be implemented by non-transitory computer-readable medium including a program for instructing a computer to perform the methods.

In another general aspect, there is provided a hierarchical cell system including at least one mobile terminal and a base station including a channel database that stores information about each of at least one route of the at least one mobile terminal, wherein a wireless resource for the at least one mobile terminal is transmitted to the at least one mobile terminal by the base station, the wireless resource being determined by the base station based on a mobility of the at least one mobile terminal and information stored in the channel database.

According to one example, by a base station determining a wireless resource of a target terminal based on information about a channel and information about a mobility of the target terminal in each of at least one route, the wireless resource may be provided to the target terminal in a multi-cell environment.

According to another example, by a base station determining a feedback wireless resource based on information about a channel and information about a mobility of the target terminal in each of at least one route, and by the target terminal feeding back channel state information using only the determined feedback wireless resource, a use of resources for feeding back a channel may be reduced.

According to another example, by adaptively adjusting a feedback wireless resource by a base station, a feedback wireless resource becomes available for a target terminal experiencing a change of a channel in a multi-cell environment.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Hereinafter, a vehicular mobile terminal may be characterized as including one or more of a communication terminal included in a vehicle, a communication terminal belonging to a user riding a vehicle, and other user equipments capable of performing a similar function performed by a communication terminal. Here, the vehicle may include one or more of public transportation moving along a predetermined route, a car equipped with a navigation system, and the like.

Figure 1A:
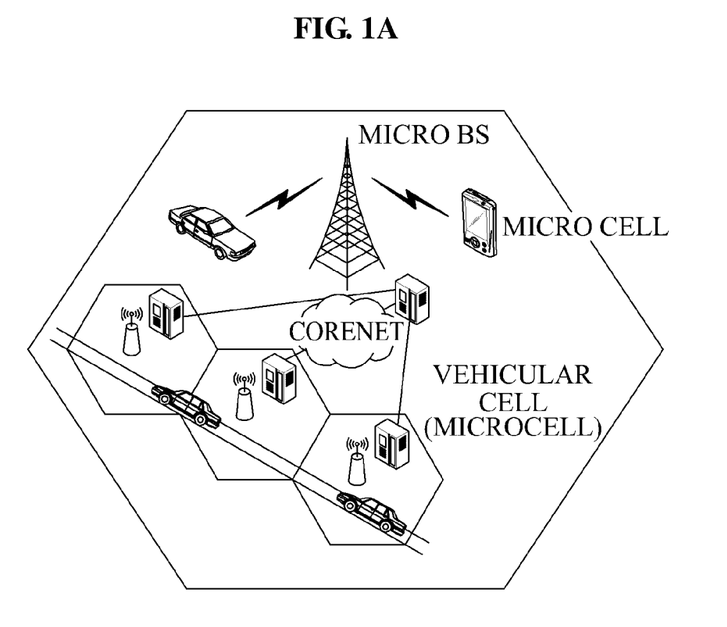
FIG. 1A is a diagram illustrating an example of a hierarchical cell system.
Figure 1B:
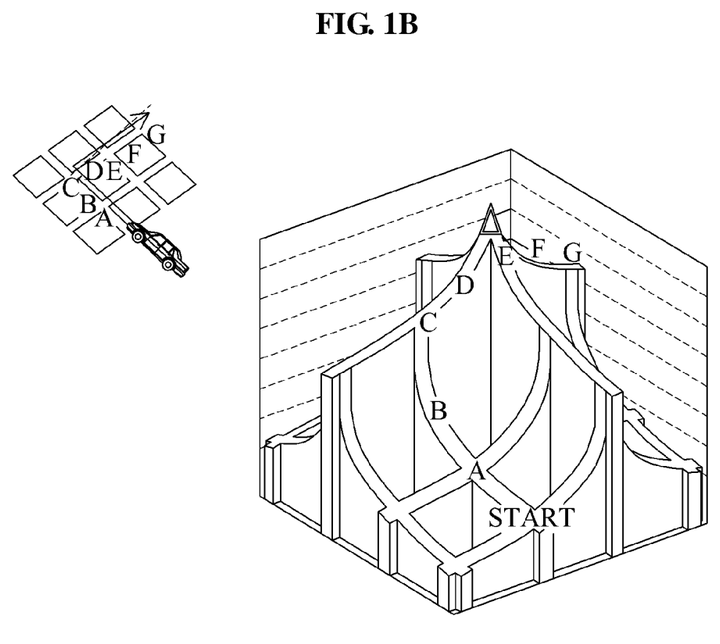
FIG. 1B is a diagram illustrating an example of a change of a channel of a vehicular mobile terminal in a hierarchical cell system.

FIG. 1A illustrates an example of a hierarchical cell system, and FIG. 1B illustrates an example of a change of a channel of a vehicular mobile terminal in the hierarchical cell system.

Referring to FIG. 1A, in a communication system, donor cells in an urban environment may be reduced in size to form a wireless backhaul that provides a high capacity wireless service to a vehicular mobile terminal moving at a high speed. In an urban environment, the vehicular mobile terminal may experience changes in a channel due to the reduction in size of cells and moving at a high speed. In order to feed back channel information in an environment where a channel changes, the vehicular mobile terminal may use a substantial amount of resources. Thus, the vehicular mobile terminal or other terminals experiencing changes in a channel in a multi-cell environment may apply a scheme for effectively feeding back channel state information.

Referring to FIG. 1B, a change of a channel of the vehicular mobile terminal in the system illustrated in FIG. 1A is described.

As an example for clarity of discussion, a set of grid-like paths, such as that found in an urban environment, is illustrated in FIG. 1B and described herein.

When a simulation using a WINNER B1 environment is performed with respect to the grid-like path, a result such as the right graph of FIG. 1B may be obtained. Here, the WINNER B1 environment may correspond to an environment where a line of sight (LOS) and a non-line of sight (NLOS) are differently set according to a direct distance from a base station.

As an example, in the left diagram of FIG. 1B, a path from a starting point A (where the vehicular mobile terminal begins moving) to a point C may correspond to an NLOS environment, and a path from the point C to a point G may correspond to an LOS environment. Thus, while moving from the starting point A to the point C, the vehicular mobile terminal may receive a relatively weak signal compared with a received signal while moving to the point G from the point C. Accordingly, when the vehicular mobile terminal receives a signal along the path from the point C to the point G, communication may be performed at a relatively high efficiency.

The base station may determine a wireless resource enabling the vehicular mobile terminal to receive a substantially optimal service (for example, a service such as a scheduling, a handover, and the like) using information regarding a channel (such as a location, channel information, a moving velocity, and the like) of the vehicular mobile terminal in each of at least one route of a corresponding path. As an example of the wireless resource enabling the vehicular mobile terminal to receive a substantially optimal service, a feedback wireless resource may be provided. Here, the feedback wireless resource may include a feedback time interval used for feeding back channel state information to the base station by a corresponding terminal, a delay time remaining until the feedback time interval, and the like.

The feedback time interval may indicate a channel interval where the corresponding terminal is expected to receive a substantially optimal service, and the delay time remaining until the feedback time interval may indicate a transmission delay time until a subsequent feedback starting point.

Here, the vehicular mobile terminal may reduce an amount of resources used for feedback, by performing a feedback with respect to short-term channel information in the feedback time interval determined by the base station.

Figure 2:
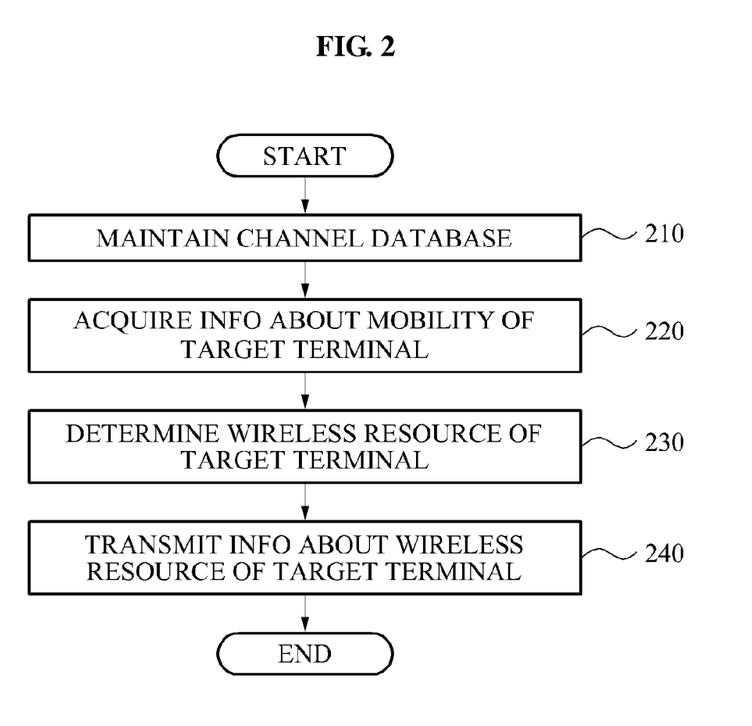
FIG. 2 is a flowchart illustrating a communication method of a base station.

FIG. 2 illustrates a communication method of a base station. Referring to FIG. 2, in operation 210, the base station maintains a channel database that includes information about a channel in each of at least one route.

In operation 210, the base station may acquire the information about the channel in each of the at least one route using at least one vehicular mobile terminal having a planned route. Here, the planned route may include a route used by a vehicular mobile terminal such as a bus line, a freeway, a national highway, and the like. Further, the planned route may be determined in advance.

The base station may acquire the information about the channel in each of the at least one route by receiving, from the at least one vehicular mobile terminal, information about one or more of a channel, a location, and a velocity of the at least one vehicular mobile terminal. Here, the information about the channel of the at least one vehicular mobile terminal may include a channel state value such as a received signal strength (RSS) reported by the vehicular mobile terminal, a signal-to-interference plus noise ratio (SINR) received by the vehicular mobile terminal, and the like.

The base station may periodically or intermittently update the information about one or more of a channel, a location, and a velocity of the at least one vehicular mobile terminal.

If the vehicular mobile terminal moves in a route that deviates from a registered or planned route such as a vehicle having a vehicle navigation system, or if information about a destination or a moving route is not measured or received in advance, the base station may frequently receive, from a corresponding vehicular mobile terminal, information about one or more of a changed channel, a location, and a velocity.

Further, the base station may receive the information about one or more of a changed channel, a location, and a velocity of the at least one vehicular mobile terminal if a change of a channel of the at least one vehicular mobile terminal exceeds a predetermined level (for example, a channel boundary value).

As an example, a change of a channel received by a bus on a regular route while the bus moves from "Gangnam station" to "Sinnonhyeon station" may be relatively small, and a power of a signal received while the bus moves from "Sinnonhyeon station" to "Express bus terminal" may increase relatively rapidly.

For an interval where a signal received by the bus increases, thereby exceeding a predetermined level (for example, an interval from "Sinnonhyeon station" to a direction of "Express bus terminal", except for an interval from "Gangnam station" to "Sinnonhyeon station"), the bus may transmit, to the base station, information about one or more of a channel, a location, a velocity, and the like, of the corresponding bus.

In operation 220, the base station acquires information about a mobility of a target terminal.

The information about a mobility of a target terminal may include at least one of information about a location of the target terminal, information about a velocity of the target terminal, information about a moving direction of the target terminal, and information about a signal light present in a route of the target terminal.

The base station may acquire the information about a location of the target terminal by directly receiving the information about a location from the target terminal or from a global positioning system (GPS) server of the target terminal, or by measuring a location of the target terminal using a location determination technology.

In operation 230, the base station determines a wireless resource of the target terminal based on the information about a mobility of a target terminal and the information stored in the channel database. Additionally, in operation 230, the base station may determine a feedback wireless resource used for feeding back channel state information by the target terminal, based on the information about a mobility of a target terminal and the information stored in the channel database.

In operation 240, the base station transmits, to the target terminal, information about the wireless resource of the target terminal.

Figure 3:
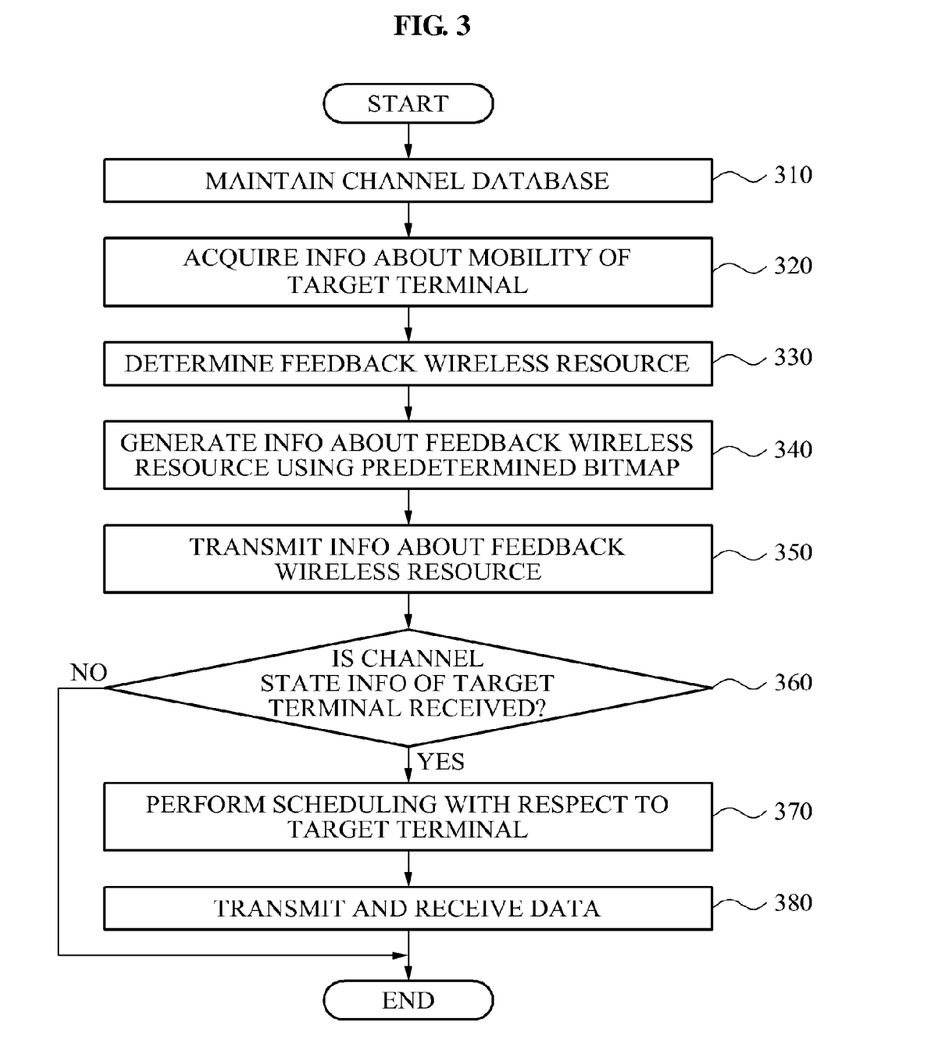
FIG. 3 is a flowchart illustrating a scheme for adaptively adjusting a feedback wireless resource by a base station.

FIG. 3 illustrates a scheme for adaptively adjusting a feedback wireless resource by a base station.

Referring to FIG. 3, in operation 310, the base station maintains a channel database storing information about a channel in each of at least one route. In operation 310, the base station may acquire the information about the channel in each of the at least one route using at least one vehicular mobile terminal having a planned route. Here, the planned route may include a route used by a vehicular mobile terminal such as a bus line, a freeway, a national highway, and the like, and the planned route may be determined or obtained in advance.

In operation 320, the base station acquires information about a mobility of a target terminal.

Here, the target terminal may be a terminal that is a target to be informed of a feedback wireless resource determined in advance by the base station and used for feeding back channel state information of a corresponding terminal to the base station. Furthermore, examples of the target terminal include a vehicular mobile terminal and a portable mobile terminal carried by a pedestrian.

In operation 320, the information about a mobility of a target terminal may include at least one of information about a location of the target terminal, information about a velocity of the target terminal, information about a moving direction of the target terminal, and information about a signal light present in a route of the target terminal.

In operation 330, the base station determines or estimates the feedback wireless resource used for feeding back the channel state information by the target terminal, according to the information about a mobility of a target terminal and the information stored in the channel database.

The feedback wireless resource may include at least one of a feedback time interval for feeding back channel state information by the target terminal and a delay time remaining until the feedback time interval. Accordingly, the base station may determine at least one of the feedback time interval for feeding back channel state information by the target terminal and the delay time remaining until the feedback time interval.

The base station may determine the at least one of the feedback time interval and the delay time based on at least one of information about a traffic rate requested by the target terminal and information about an allowable limit of a delay time of the target terminal.

To determine the at least one of the feedback time interval and the remaining delay time, the base station may compare a predetermined channel boundary value with a value associated with the channel state information of the target terminal. The base station may use a result of the comparison to determine the at least one of the feedback time interval and the remaining delay time.

Figure 6:
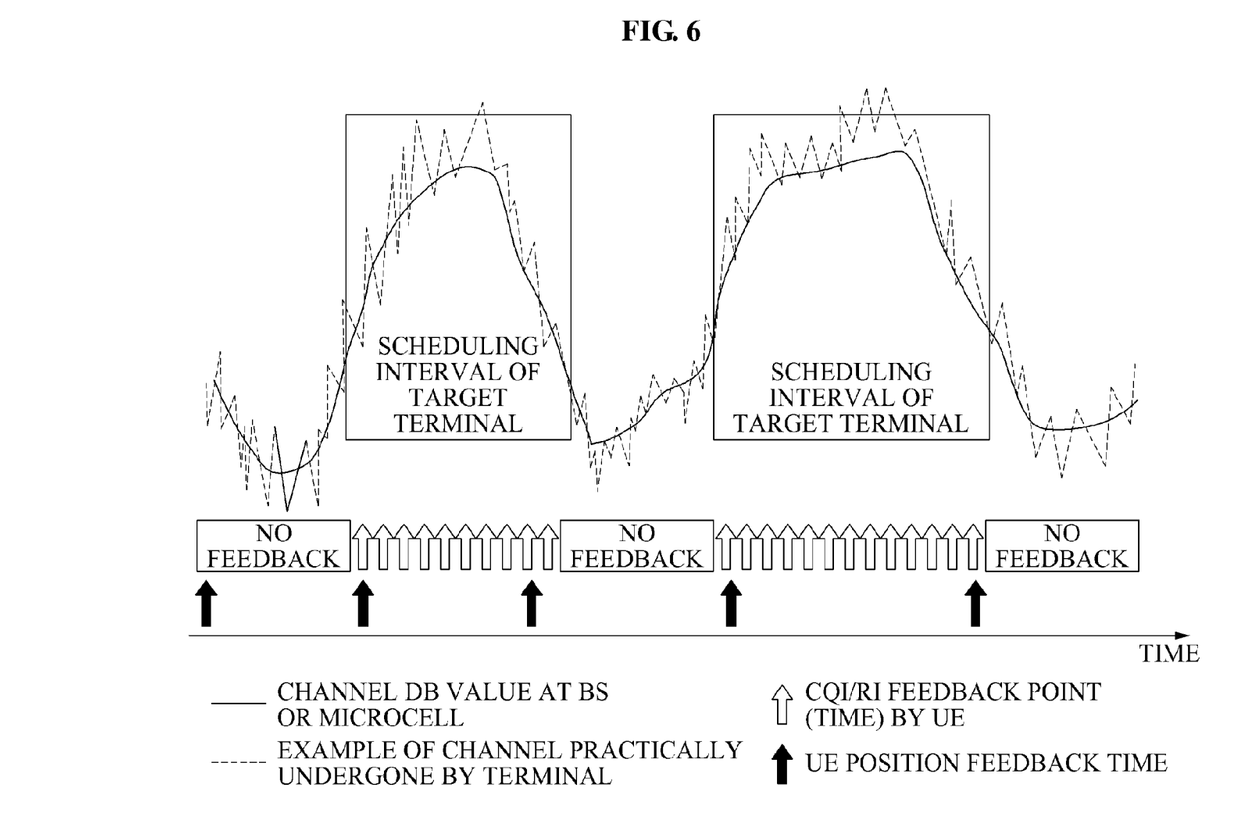
FIG. 6 is a diagram illustrating a hierarchical feedback scheme for determining a feedback time interval or a delay time of a vehicular mobile terminal.

A scheme of determining, according to the channel boundary value, the at least one of the feedback time interval and the delay time remaining until the feedback time interval is further described herein with reference to FIG. 6.

The base station may adaptively adjust the channel boundary value based on at least one of a channel quality of the target terminal, a traffic rate requested by the target terminal, and a channel reliability of the target terminal. A scheme of adaptively adjusting the channel boundary value by the base station is further described herein with reference to FIG. 7.

The base station generates the information about the feedback wireless resource using a bitmap defined in advance in operation 340, and transmits, to the target terminal, the information about the feedback wireless resource indicated by the bitmap in operation 350.

The base station may generate a control message for reporting a time when the target terminal feeds back the channel state information to the base station, based on the determined feedback time interval or remaining delay time.

In operation 360, the base station determines whether the channel state information of the target terminal is received. In operation 360, the base station may receive the channel state information of the target terminal using the feedback wireless resource.

If the channel state information of the target terminal is received or fed back in operation 360, the base station performs scheduling with respect to the target terminal in operation 370, and performs data transmission and reception with the target terminal in operation 380. If the base station does not receive a feedback of the channel state information of the target terminal, the base station may bypass the scheduling and the data transmission and reception, without performing a specific operation.

In operation 370, the base station may also perform various additional operations, such as a handover using the channel state information of the target terminal.

Figure 4:
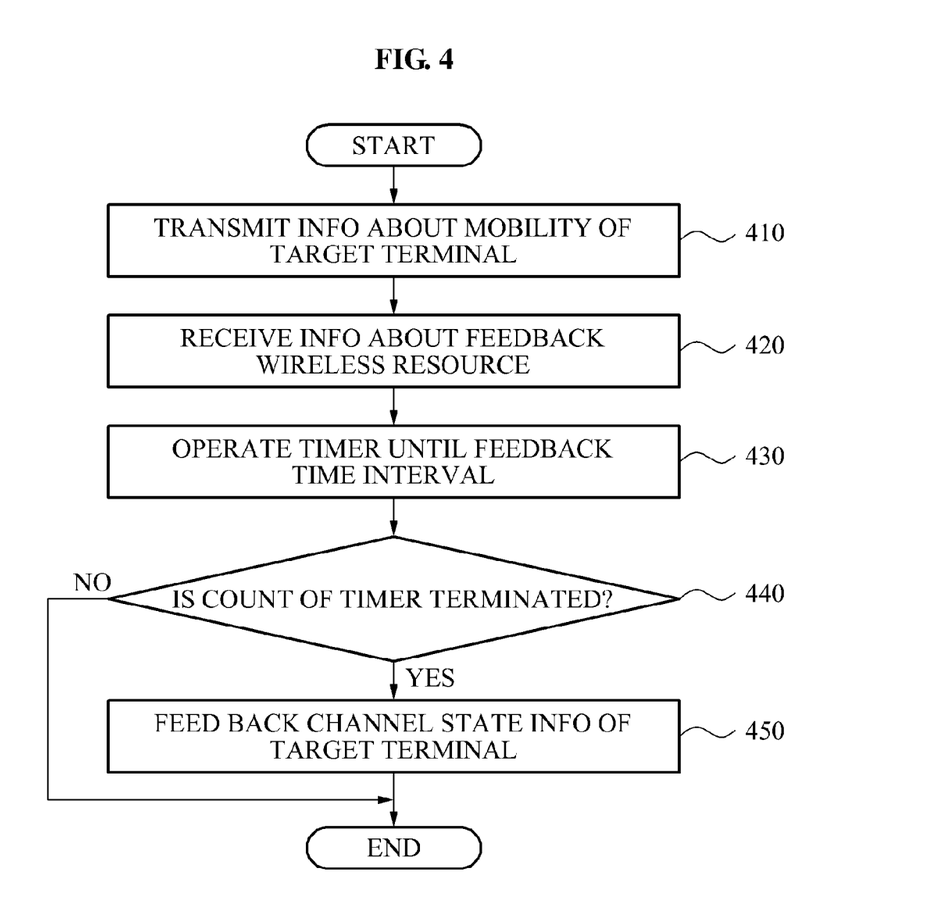
FIG. 4 is a flowchart illustrating a communication method of a target terminal.

FIG. 4 includes a communication method of a target terminal.

Referring to FIG. 4, in operation 410, the target terminal transmits, to a base station, information about a mobility of the target terminal.

The information about a mobility of the target terminal may include at least one of information about a location of the target terminal, information about a velocity of the target terminal, information about a moving direction of the target terminal, and information about a signal light present in a route of the target terminal.

The information about a location of the target terminal may be measured by the base station using a location determination technology, or may be received, by the base station, from the target terminal or from a GPS server of the target terminal.

If a channel of the target terminal changes relatively rapidly, or if a location of the target terminal changes (for example, due to a change of a velocity) after the target terminal measures or receives the information about a location of the target terminal, the target terminal may update information about a mobility of the target terminal to the base station.

In operation 420, when a wireless resource of the target terminal is determined by the base station based on information about a channel and information about a mobility of the target terminal in each of at least one route, the target terminal receives, from the base station, information about the wireless resource of the target terminal.

Here, the information about the wireless resource of the target terminal may include information about a feedback time interval used for feeding back the channel state information by the target terminal, or a feedback wireless resource with respect to a delay time remaining until the feedback time interval.

The target terminal may detect the feedback wireless resource from information about the feedback wireless resource using a predetermined bitmap.

In operation 430, the target terminal operates a timer counting down from a delay time remaining until the feedback time interval.

The target terminal determines whether the count of the terminal is terminated in operation 440, and may transmit data to the base station using the wireless resource of the target terminal in response to the termination of the count.

In operation 450, the target terminal feeds back channel state information of the target terminal using the wireless resource of the target terminal including the information about the feedback wireless resource. Here, the channel state information of the target terminal may include a channel quality indication (CQI), a channel direction indicator (CDI), and various other types of information that can indicate a state of a channel.

If the count of the terminal is not terminated in operation 440, the target terminal may bypass the feeding back of channel state information, without performing a specific operation.

Figure 5:
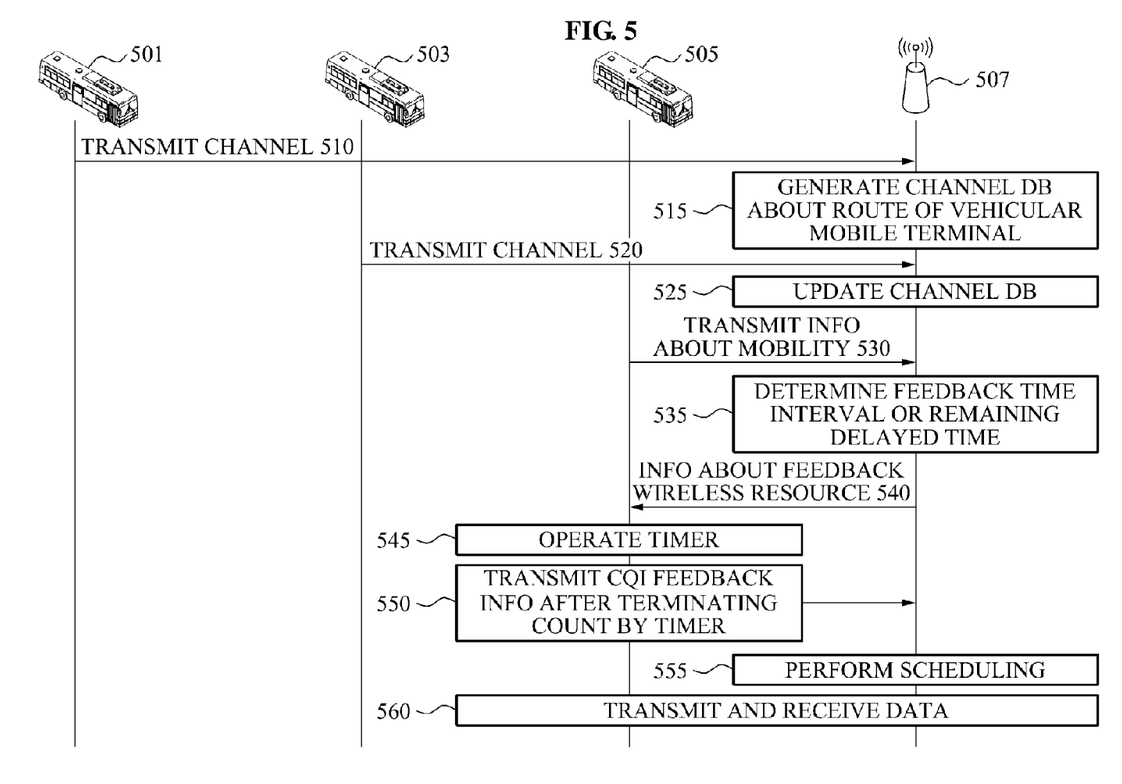
FIG. 5 is a diagram illustrating a hierarchical feedback operation between a terminal and a base station in a hierarchical cell system.

FIG. 5 illustrates a hierarchical feedback operation between a terminal and a base station in a hierarchical cell system. Referring to FIG. 5, a network for describing a hierarchical feedback operation may include a first vehicular mobile terminal 501, a second vehicular mobile terminal 503, a target terminal 505, and a base station 507.

Here, the first vehicular mobile terminal 501 and the second vehicular mobile terminal 503 may correspond to a vehicular mobile terminal moving along at least one planned route of the target terminal 505, for example, the same line, road, and the like.

In operation 510, the first vehicular mobile terminal 501 may periodically or aperiodically feed back information about a channel in a corresponding route to the base station 507, while receiving a service from the base station 507.

In operation 515, the base station 507 generates a channel database entry, using feedback information to store information about a channel according to a route and a location in a corresponding route. Here, the feedback information may include information about a channel in a corresponding route.

The base station 507 receives information about a channel in at least one route according to feedback from the second vehicular mobile terminal 503 in operation 520, and updates the channel database in operation 525.

Thereafter, when the target terminal 505 feeds back information about a mobility of the target terminal 505 to the base station 507 in operation 530, the base station 507 determines or estimates a feedback wireless resource using the information about a mobility of the target terminal 505 and the information stored in the channel database in operation 535.

Here, the feedback wireless resource may include at least one of a feedback time interval used for feeding back channel state information by the target terminal 405, and a delay time remaining until the feedback time interval.

To determine or estimate a feedback wireless resource, the base station 507 may obtain information about a channel in a route to be used by the target terminal 505.

To obtain the information about a channel in a route to be used by the target terminal 505, the base station 507 may use information fed back by the first vehicular mobile terminal 501 using a route to be used by the target terminal 505 and information updated by the second first vehicular mobile terminal 503.

When the base station 507 transmits, to the target terminal 505, the information about the feedback wireless resource in operation 540, the target terminal 505 operates a timer counting down a delay time remaining until the feedback time interval in operation 545.

In response to a termination of the count of the delay time, the target terminal 505 transmits, to the base station 507, channel state information of the target terminal 505 in operation 550.

The channel state information of the target terminal 505 may include, for example, a CQI, a CDI, and various other types of information that can indicate a state of a channel.

The channel state information of the target terminal 505 may include short-term channel information and long-term channel information.

In operation 555, the base station 507 performs an operation with respect to the target terminal 505 such as scheduling, handover, and the like, according to the channel state information of the target terminal 505.

Thereafter, in operation 560, the target terminal 505 and the base station 507 exchange data requested in response to the operation performed in operation 555.

FIG. 6 illustrates a hierarchical feedback scheme for determining a feedback time interval or a delay time of a vehicular mobile terminal To perform a hierarchical feedback, the vehicular mobile terminal may feed back, to a base station, information about a channel in each of at least one route. As described with reference to FIG. 1B, the vehicular mobile terminal may experience a significant change in a channel while passing through a building block or an intersection. The vehicular mobile terminal may transmit, to the base station, information about one of a channel, a location, and a velocity of the vehicular mobile terminal, in an interval, that is, a B-C interval and a C-D interval where a channel changes relatively rapidly.

To acquire the information about a location of the vehicular mobile terminal, each vehicular mobile terminal may use various methods, including a triangulation scheme based on a strength of a received signal, a cell identification, a time difference of arrival (TDoA), a GPS receiver, and the like.

When the vehicular mobile terminal transmits the information about one of the channel, the location, and the velocity of the vehicular mobile terminal, the base station may determine or estimate at least one of a feedback time interval and a remaining delay time, based on at least one of information about a mobility of the target terminal, information about a traffic rate requested by the target terminal, and information about an allowable period of a delay time of the target terminal.

The information about a mobility may include at least one of information about a location of the target terminal, information about a velocity of the target terminal, information about a moving direction of the target terminal, and information about a signal light present in a route of the target terminal.

The base station broadcasts, to the target terminal, information about a delay time remaining until a subsequent feedback time interval or a feedback point in time, based on a determined feedback time interval.

For example, if a vehicular mobile terminal has a route shown in the left diagram of FIG. 1B, the base station may suspend feedback of channel state information from a starting point to a point B, and may perform feedback of channel state information from a point in time when the vehicular mobile terminal is expected to reach the point B.

Accordingly, in an example where a distance of the building block is assumed to be 100 m, and a velocity of a mobile terminal is assumed to be 30 km/h, (that is, 8.33 m/sec), the channel state information may not be fed back for approximately 18 seconds from the staring point to the point B. Thus, the amount of resources used for feedback may be reduced.

Figure 7:
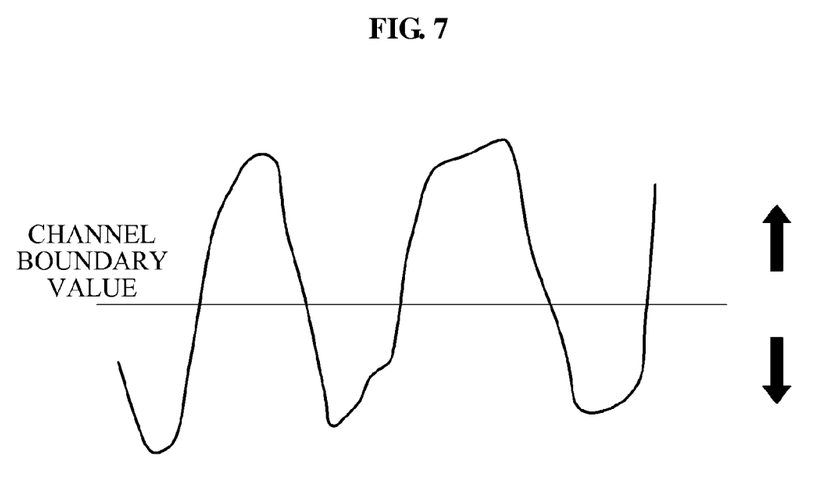
FIG. 7 is a diagram illustrating a scheme for adaptively adjusting a channel boundary value.

FIG. 7 illustrates a scheme for adaptively adjusting a channel boundary value.

A base station may predetermine the channel boundary value used for determining at least one of a feedback time interval used for feeding back channel state information and a delay time remaining until the feedback time interval.

The base station may adaptively adjust the channel boundary value based on at least one of a channel quality of a target terminal (that is, an expected channel with respect to the target terminal), an average SINR, a rate requested by the target terminal, a channel reliability of the target terminal, and the like.

Referring to FIG. 7, as the rate requested by the target terminal increases, as the channel quality of the target terminal increases, or as the channel reliability (that is, a reliability of the feedback channel of the target terminal) increases based on a predetermined channel boundary value, the base station may increase a channel boundary value for determining a feedback time interval or a remaining delay time of the target terminal. If the above conditions are satisfied, even though the feedback time interval or the remaining delay time is reduced, receiving of the channel state information of the target terminal may not be substantially impeded and thus, the channel state information of the target terminal may be sufficiently fed back with relatively less feedback time interval.

Conversely, as the rate requested by the target terminal decreases, as the channel quality of the target terminal decreases, or as the channel reliability (that is, a reliability of the feedback channel of the target terminal) decreases based on the predetermined channel boundary value, the base station may increase the channel boundary value to handle a retransmission in the feedback time interval and an increase in requested wireless resources.

The base station may compare a predetermined channel boundary value with a value associated with channel state information of the target terminal, and may determine one of the above conditions corresponding to a comparing result.

Hereinafter, the base station may determine at least one of the feedback time interval and a remaining delay time based on the result of the comparison.

Accordingly, the base station may adjust the channel boundary value based on at least one of a channel quality of the target terminal, a traffic rate requested by the target terminal, and a channel reliability of the target terminal.

As an example, an amount of time of a time interval according to a predetermined channel boundary value may be "6", and an amount of time of a time interval corresponding to the channel state information of the target terminal may be "3".

In this example, when the predetermined channel boundary value is compared with the amount of time corresponding to the channel state information of the target terminal, the value associated with the channel state information of the target terminal may be less than the channel boundary value. Since a time interval corresponding to "3" may be sufficient for feeding back the channel state information of the corresponding target terminal, the base station may increase the channel boundary value.

For the channel quality of the target terminal, the rate requested by the target terminal, and the channel reliability of the target terminal, the feedback time interval or the remaining delay time may be determined by adjusting the channel boundary value.

Figure 8:
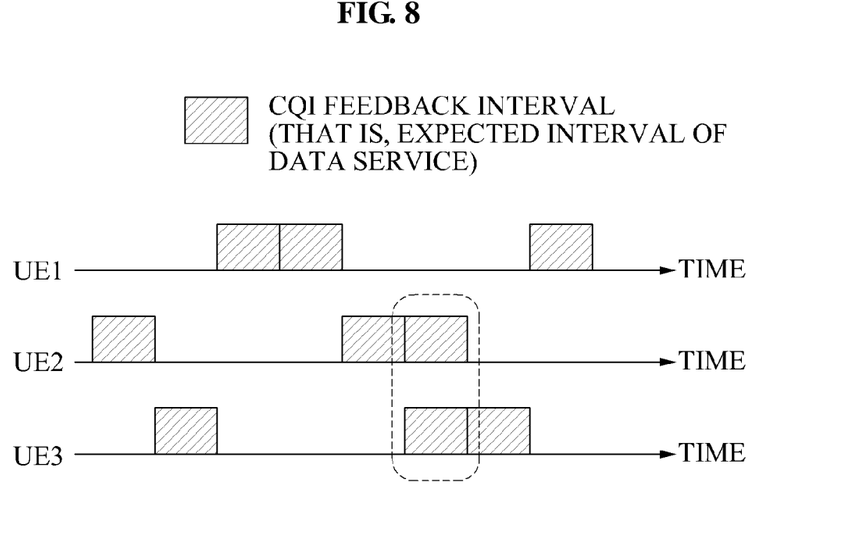
FIG. 8 is a diagram illustrating a scheme for performing scheduling with respect to multiple target terminals using a feedback wireless resource.

FIG. 8 illustrates a scheme for performing scheduling with respect to multiple target terminals using a feedback wireless resource.

Referring to FIG. 8, a base station may determine a feedback wireless resource used for feeding back channel state information by each target terminal based on information about a mobility fed back from a target terminal and information about a channel in each route stored in a channel database.

Each target terminal may obtain a feedback time interval by a broadcast with respect to a delay time remaining until the feedback time interval broadcast by the base station. Each target terminal may feed back channel state information as illustrated in FIG. 8 using a resource for feedback in each interval, thereby feeding back short-term channel state information.

The base station may perform scheduling with respect to a target terminal included in a feedback time interval determined by the base station (for example, a target terminal included in an interval indicated by the dotted line in FIG. 8), using the channel state information of each received target terminal. Accordingly, the channel state information of each target terminal may correspond to channel state information of a target terminal that the base station expects to feed back channel state information in the feedback time interval.

The processes, functions, methods and/or software described above including a communication method of a base station and a target terminal may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical to media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a base station, comprising:
storing, in a channel database, information about a channel in each of at least one route;
acquiring information about a mobility of a target terminal;
determining a wireless resource for the target terminal based on the information about a mobility of a target terminal and the information stored in the channel database; and
transmitting, to the target terminal, information about the wireless resource of the target terminal,
wherein the determining comprises determining a feedback wireless resource, and
wherein the determining of the feedback wireless resource comprises determining at least one of feedback time interval and delay time by
comparing a predetermined channel boundary value with a value associated with the channel state information of the target terminal, and
using a result of the comparing to determine the at least one of the feedback time interval and the delay time.

2. The method of claim 1, wherein the storing comprises acquiring the information about the channel in each of the at least one route using at least one vehicular mobile terminal having a planned route.

3. The method of claim 2, wherein the acquiring of the information about the channel comprises receiving, from the at least one vehicular mobile terminal, information about one of a channel, a location, a velocity of the at least one vehicular mobile terminal, and any combination thereof.

4. The method of claim 3, wherein the receiving comprises receiving the information about the one of a channel, a location, and a velocity of the at least one vehicular mobile terminal when a change of a channel of the at least one vehicular mobile terminal exceeds a predetermined level.

5. The method of claim 1, wherein the information about a mobility of the target terminal includes at least one of information about a location of the target terminal, information about a velocity of the target terminal, information about a moving direction of the target terminal, information about a signal light present in a route of the target terminal, and any combination thereof.

6. The method of claim 5, wherein the information about a location of the target terminal is measured using a location determination technology determined in advance, or is received from the target terminal or from a global positioning system (GPS) server of the target terminal.

7. The method of claim 1, further comprising:
generating the information about the wireless resource using a predetermined bitmap.

8. The method of claim 1, wherein the determining of the feedback wireless resource is used for feeding back channel state information by the target terminal, based on the information about the mobility of the target terminal and the information stored in the channel database.

9. The method of claim 8, further comprising:
receiving the channel state information of the target terminal using the feedback wireless resource.

10. The method of claim 8, wherein the feedback time interval is used for feeding back channel state information by the target terminal and the delay time remains until the feedback time interval.

11. The method of claim 1, wherein the determining of the at least one of the feedback time interval and the delay time comprises adjusting the channel boundary value based on at least one selected from the group of a channel quality of the target terminal, a traffic rate requested by the target terminal, a channel reliability of the target terminal, and any combination thereof.

12. The method of claim 1, wherein the determining of the at least one of the feedback time interval and the delay time comprises determining the at least one of the feedback time interval and the delay time, based on at least one of information about a traffic rate requested by the target terminal and information about an allowable limit of a delay time of the target terminal.

13. A communication method of a target terminal, the method comprising:
receiving, from a base station, information about a wireless resource of the target terminal; and
transmitting data to the base station using the wireless resource of the target terminal,
wherein the wireless resource of the target terminal is determined by the base station based on information about a channel and information about a mobility of the target terminal in each of at least one route, and
wherein the determination by the base station comprises determining a feedback wireless resource by determining at least one of feedback time interval and delay time comprising comparing a predetermined channel boundary value with a value associated with the channel state information of the target terminal, and using a result of the comparing to determine the at least one of the feedback time interval and the delay time.

14. The method of claim 13, wherein the transmitting comprises feeding back channel state information of the target terminal using the wireless resource of the target terminal.

15. The method of claim 14, wherein the feeding back comprises:
operating a timer counting a delay time remaining until the feedback time interval used for feeding back the channel state information by the target terminal; and
transmitting, to the base station, the channel state information of the target terminal in response to a completion of the counting.

16. The method of claim 13, wherein the information about the wireless resource of the target terminal includes at least one of information about the feedback time interval used for feeding back the channel state information by the target terminal and a feedback wireless resource with respect to the delay time remaining until the feedback time interval.

17. The method of claim 16, further comprising:
detecting the feedback wireless resource from information about the feedback wireless resource using a predetermined bitmap.

18. The method of claim 14, further comprising:
transmitting, to the base station, the information about the mobility of the target terminal.

19. The method of claim 18, wherein the information about a mobility of the target terminal includes at least one of information about a location of the target terminal, information about a velocity of the target terminal, information about a moving direction of the target terminal, information about a signal light present in a route of the target terminal, and any combination thereof.

20. A non-transitory computer-readable medium comprising a program for instructing a computer to perform the method of claim 1.

21. A hierarchical cell system, comprising:
at least one mobile terminal; and
abuse station including a channel database that stores information about each of at least one route of the at least one mobile terminal,
wherein a wireless resource for the at least one mobile terminal is transmitted to the at least one mobile terminal by the base station, the wireless resource being determined by the base station based on a mobility of the at least one mobile terminal and information stored in the channel database, and
wherein the determination by the base station comprises determining a feedback wireless resource by determining at least one of feedback time interval and delay time comprising comparing a predetermined channel boundary value with a value associated with the channel state information of the target terminal, and using a result of the comparing to determine the at least one of the feedback time interval and the delay time.

* * * * *